United States Patent Office 3,667,918
Patented June 6, 1972

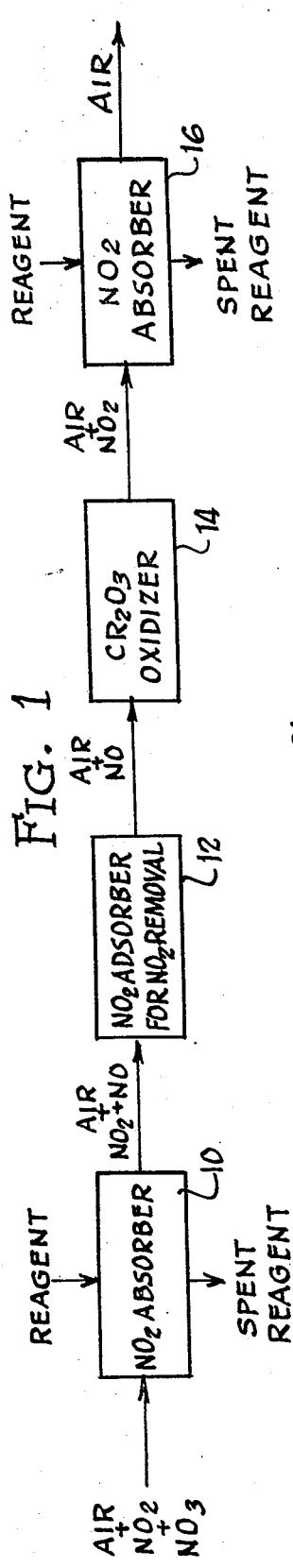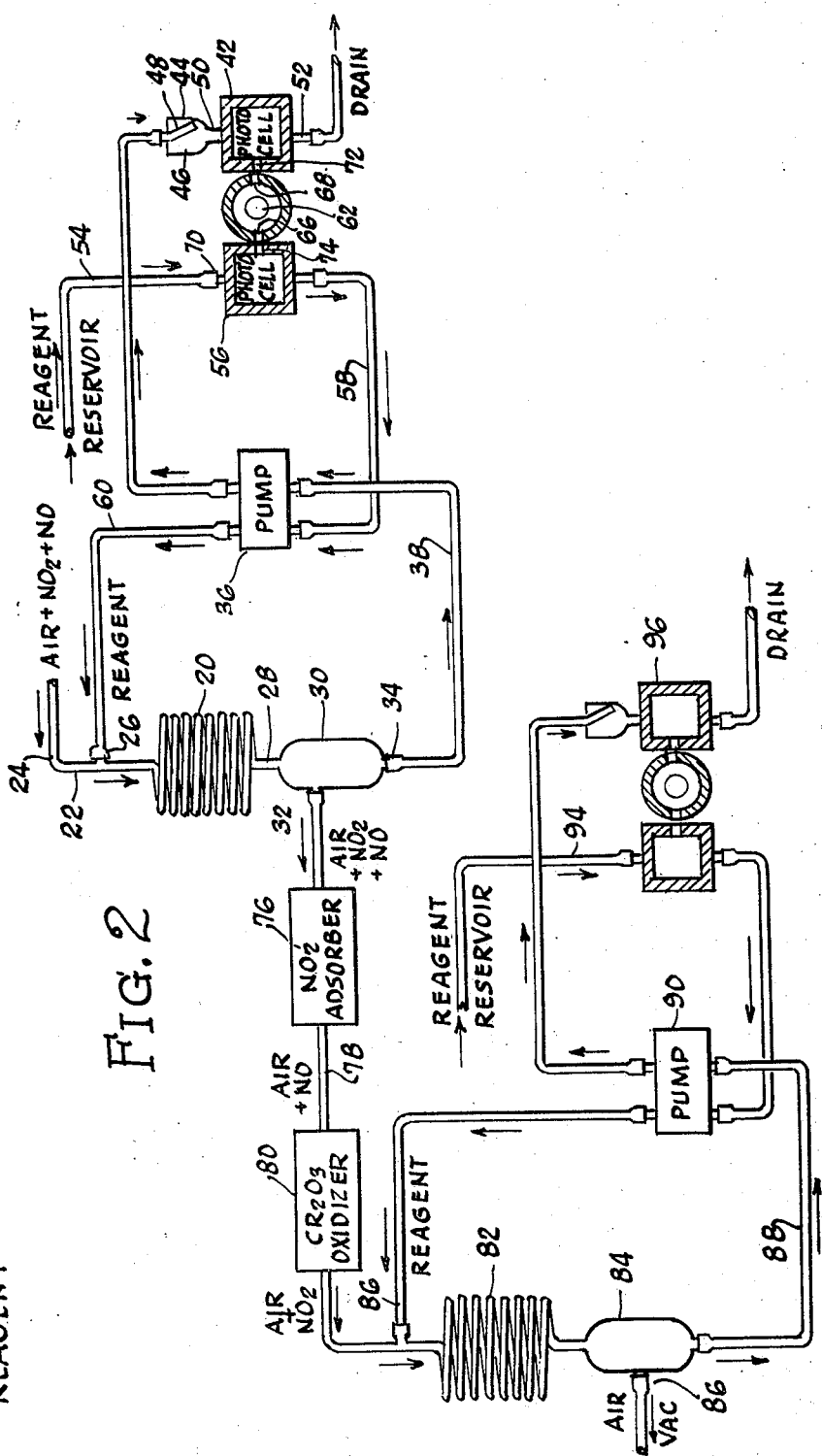

3,667,918
METHOD AND APPARATUS FOR ANALYSIS OF NO AND NO₂
Norman A. Lyshkow, Chicago, Ill., assignor to Pollution Monitors, Inc., Chicago, Ill.
Filed Feb. 17, 1971, Ser. No. 116,188
Int. Cl. G01n *31/06, 21/06*
U.S. Cl. 23—232 R    14 Claims

ABSTRACT OF THE DISCLOSURE

Method and apparatus for determining the concentration of NO and $NO_2$ in gas sample in which a gas sample containing NO and $NO_2$ is first passed through a scrubber in which the sample is contacted with a reagent solution capable of development of color in response to contact with $NO_2$, with the intensity of the color thus developed being a measure of the $NO_2$ content of the gas sample, and then the unabsorbed gases are treated to remove residual amounts of $NO_2$ and the NO in the sample is oxidized to $NO_2$ which is absorbed in a second scrubber with a reagent solution capable of development of color in response to contact with $NO_2$, with the intensity of color developed in the second scrubber being a measure of the NO content of the gas sample.

---

This invention relates to colorimetric analysis of gas streams, and more particularly to a new and improved method and apparatus for colorimetric determination of the content of NO and $NO_2$ is gaseous streams.

Colorimeters and colorimetric methods for determining the NO and $NO_2$ content of gas streams, such as air, are well-known to the art and have been used for many years because of their sensitivity and accuracy. Most of such colorimetric methods have involved the absorption of the $NO_2$ component from the gas sample in a reagent solution in the form of an aqueous solution of an amine salt capable of reaction with nitrite ions to form a diazo compound and a coupling compound capable of reaction with diazo compound to form an azo dye which imparts a coloration to the reagent solution. The intensity of the color developed in the reagent solution as the reagent solution is contacted with $NO_2$ is proportional to the concentration of the $NO_2$ in the gas sample.

The chemical mechanism involved in such colorimetric methods was first described by Greiss [Bemerkungen ueber abhandlung der H. H. Werselsky und Benedi KT, "Ueber Einige Azoverbundungen," Ber. 12, 426(1879)], in accordance with the following:

$$R-NH_2 \cdot HCl + HNO_2 \rightleftharpoons 2H_2O + R-N\equiv N\underset{Cl}{|}$$

Thus, the $NO_2$ absorbed in the aqueous reagent solution forms nitrous acid which in turn reacts with the amine component of the reagent solution to form the corresponding diazo compound:

wherein R is an organic radical. The resulting diazo compound, as it is formed, reacts with the coupling compound in the form of an aromatic amine or phenolic compound to form an azo dye:

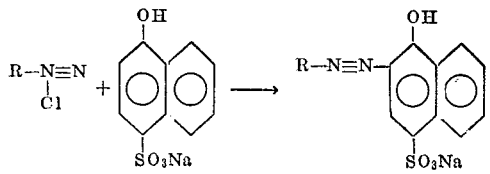

One of the first colorimetric methods based upon the foregoing reactions was described by Jacobs and Brody in "A Rapid Method for the Determination of Nitrogen Dioxide-Nitrogen Tetroxide Within an Atmosphere," a paper presented at Met. N.Y. Sect. Am. Ind. Hyg. Assoc. (1945). However, the method as described was found to require about 30 minutes for optimum color development, which renders the method unsuitable for the continuous monitoring of nitrogen dioxide in air.

Substantial improvements in the foregoing colorimetric method have been described by Lyshkow in "A Rapid and Sensitive Colorimetric Reagent for Nitrogen Dioxide in Air, Journal of the Air Pollution Control Association, 15, pp. 481–4 (October 1965), in which description is made of a reagent composition containing N-(1-naphthyl) ethylene diamine hydrochloride, sulfanilic acid or sulfanilamide and 2-naphthol-3,6-disulfonic acid disodium salt as well as wetting agents and the like in aqueous medium. The reagent composition is thus capable of the development of color almost immediately on contact with nitrogen dioxide.

The foregoing mechanism is specific to analysis for $NO_2$ and is incapable of directly analysing the NO content of the gas stream. However, it has been proposed to modify the method described by first absorbing the $NO_2$ component from the gas sample with the reagent solution for analysis as described and then subjecting the remainder of the gas sample containing NO to an oxidation reaction whereby the NO is converted to $NO_2$ for separate analysis to determine the $NO_2$ content of the remainder of the gas sample, from which the NO content of the original gas sample can be determined.

For this purpose, it has sometimes been the practice to pass the NO-containing gas sample, after removal of the $NO_2$, through a solution of potassium permanganate to convert the NO to $NO_2$. However, this practice has not been satisfactory since the oxidation of the NO by permanganate results in the formation of a gummy precipitate of manganese dioxide, which must be continuously removed since it significantly reduces the efficiency of the oxidation reaction and absorbs NO and $NO_2$ to further destroy the accuracy of the analysis.

It is also known that chromic oxide can be used to oxidize NO to $NO_2$. However, chromic oxide is sensitive to water and humidity, and thus the oxidation reaction varies with the amount of moisture present. It would therefore be expected that $Cr_2O_3$ could not be employed in oxidation of NO to $NO_2$ with sufficient uniformity for analytical purposes.

It is an object of this invention to provide a method and apparatus for determining the content of NO and $NO_2$ in gas samples with improved accuracy.

It is a more specific object of the present invention to provide a method and apparatus for determining the content of NO and $NO_2$ in gas samples by colorimetric analysis which enables separate analyses to be made of $NO_2$ and NO by oxidation of NO to $NO_2$ in an efficient and uniform manner and which provides a more stable flow of the gas sample to thereby insure accurate results.

These and other objects and advantages of the invention will appear more fully hereinafter, and, for purposes of illustration, and not of limitation, an embodiment of the invention is shown in the accompanying drawing in which:

FIG. 1 is a schematic flow diagram of the method of the invention; and,

FIG. 2 is a schematic diagram of an apparatus embodying the concepts of the invention.

The concepts of the present invention reside in a method and apparatus for determining the content of $NO_2$ and NO in a gas sample in which the sample is first contacted with an aqueous reagent solution in an $NO_2$ absorber for the development of color in the reagent solution, the intensity of which is related to the amount of $NO_2$ in the gas sample, whereby the gas sample is humidified by the aqueous reagent solution. Thereafter, any $NO_2$ remaining in the gas sample is selectively removed to leave NO in the sample, and the NO-containing gas sample is oxidized by an oxidizing agent in solid form to $NO_2$ which is then contacted with the reagent solution in a second absorber for the development of color, the intensity of which is related to the NO-content of the gas stream.

It has been found in the practice of the invention that the step of contacting the gas sample in the first $NO_2$ absorber serves to impart a constant humidity to the gas sample as the analysis is carried out on a continuous or semi-continuous basis, and the constant humidity of the gas sample serves to activate the oxidizing agent and provide a more uniform rate of oxidation of the NO to $NO_2$ without the formation of precipitates which would otherwise serve to distort the results of the analysis.

Referring now to FIG. 1 of the drawing, there is shown a schematic flow diagram of the method of the invention in the simultaneous and continuous analysis of the NO and $NO_2$ contents of a gas sample. Thus, a gas sample is introduced to a first $NO_2$ absorber or scrubber 10 in which the sample is contacted, either concurrently or countercurrently, with an aqueous reagent solution capable of the development of color in response to the presence of nitrite ions whereby the $NO_2$ component of the gas sample is absorbed in the aqueous reagent solution and converted to nitrite ions for reaction with the diazotization agent, which subsequently reacts with the coupling compound for the development of color. The content of $NO_2$ in the gas sample can thus be determined by meaning the difference in color intensity of the reagent solution before and after contact with the gas sample.

As the absorber or scrubber 10, use can be made of any suitable apparatus for effecting intimate gas-liquid contact between the $NO_2$-containing gas sample and the aqueous reagent composition, such as packed columns or the like. The preferred scrubber for use in the practice of the present invention is a helical coil scrubber of the type disclosed in my earlier copending application, Ser. No. 46,308, filed June 15, 1970, as more fully described hereinafter, formed of capillary tubing having a small diameter whereby the liquid flows therethrough in a wave profile to minimize turbulence.

The reagent composition employed for selectively absorbing the $NO_2$ from the gas sample can be any of the Griess-type aqueous systems containing a diazotization agent and a coupling agent for the development of color on reaction with nitrite ions. Preferred diazotizing agents are primary aromatic amines, as represented by analine, sulfanilic acid and sulfanilamide, with the latter being preferred, although it will be understood that any of a variety of other diazotizing agents known to the art can similarly be employed.

As the coupling compound, use can be made of any of a number of aromatic amines or phenolic compounds capable of reaction with a diazo compound for the development of color. For this purpose, preferred coupling agents include naphthylamine, 1-naphthol-4-sodium sulfonate, N-(1-naphthyl)ethylene diamine, although use can be made of a number of others. The amine coupling agents are preferably employed in the form of their acid addition salts (e.g., hydrochloride salts) to insure their solubility in the aqueous system.

The diazotization agent and the coupling compound are formulated in aqueous medium, optionally in combination with promoters to provide rapid color development, improved color intensity and longer shelf life, such as the 2-naphthol-3,6-disulfonic acid disodium salt described in the Lyshkow article referred to above as well as wetting agents and/or organic acid (e.g., acetic acid, tartaric acid) to maintain the reagent composition at an acid pH and preferably at a pH below 5. The relative proportions of the components of the reagent solution are not critical and can be varied within wide ranges, depending somewhat upon the concentrations of $NO_2$ anticipated. For measuring the concentration of $NO_2$ in ambient air of the order of 5 to 10 p.p.h.m., best results are usually achieved when the concentration of the diazotization agent is 0.1 to 5.0 g./liter, the concentration of the coupling compound is 0.001 to 2 g./liter and the concentration of the promoter is 0 to 100 mg./liter. For a further discussion of suitable reagent compositions, reference is made to the foregoing Lyshkow article.

The following example is illustrative of a reagent composition suitable for use in the method and apparatus of this invention:

EXAMPLE

Reagent composition

N - (1 - naphthyl) - ethylene diamine dihydro chloride— 0.050 g.
Sulfanilamide—1.500 g.
Tartaric acid—15.0 g.
Wetting agent (Kodak "Photoflow")—0.25 ml.
Deionized water to 1 liter.

Thus, the contacting of the $NO_2$-containing gas sample with the acid reagent solution results in the formation of nitrite ions which are reactive with the reagent solution for the development of color, the intensity of which, as compared to the color of the reagent solution prior to contact with the gas sample, as determined by colorimetry is a measure of the concentration of the $NO_2$ in the gas sample. In addition to selectively absorbing most of the $NO_2$ from the gas sample, the gas-liquid contact in the scrubber 10 also serves to humidify the gas sample whereby the humidity thus imparted to the gas sample activates and renders more uniform the subsequent oxidation of NO as more fully described hereinafter.

The amount of humidity or moisture added to the gas sample is not critical to the practice of the invention since it is the constant value of the humidity, rather than the amount of humidity which is important in providing a uniform oxidation reaction. Constant humidity is automatically provided by maintaining relatively uniform rates of air flow and reagent flow through the scrubber 10. In general, the gas stream from the absorber usually contains at least 50% relative humidity under most conditions of operation.

The gas sample, after removal of most of the $NO_2$ in absorber 10, is drawn into an adsorber 12 for substantially complete removal of the remaining quantities of $NO_2$ in the gas stream. For this purpose, adsorber 12 is preferably provided with a non-volatile liquid or solid amine which is capable of reaction with $NO_2$ in the gas sample to selectively absorb the $NO_2$. Any of a number of compounds containing a free amino group can be used. Representative compounds include aromatic amines, such as anilin, naphthylamine, etc., $C_{10}$ or higher alkyl amines such as dodecylamine, etc. sulfanilic acid, sulfanilamide. In the most preferred embodiment of the invention, use is made of sulfanilic acid or sulfanilamide deposited on an inert carrier such as Berl saddles, firebrick, alumina, silica, etc.

Thus, as the gas sample containing residual amounts of $NO_2$ passes through adsorber 12, $NO_2$ reacts with the amine component contained therein to substantially remove residual amounts of $NO_2$ from the gas sample and resulting in an NO-containing gas sample. The NO-containing gas sample is then drawn from adsorber 12 to an oxidizer zone 14 in which it is contacted with a solid to effect the oxidation of the NO to $NO_2$.

As the oxidizing agent, use can be made of a number of normally solid materials capable of effecting oxidation of NO to $NO_2$, including potassium permanganate and preferably trivalent chromium compounds (e.g., chromic acid).

The oxidizing agent can be employed in a variety of solid forms. For example, the oxide may be deposited on an inert carrier such as silica, alumina, firebrick, etc. Alternatively, the oxidizing agent can also be employed in the form of a loosely packed bed, either alone or in admixture with an inert diluent in the form of silica, alumina, firebrick, etc. particles.

As indicated above, it has been found that the humidifying effect of the first absorber or scrubber 12 provides a substantially more uniform oxidation reaction rate since the humidity or moisture in the gas sample serves to activate the oxidizing agent for reaction with NO. This represents a significant advantage in that, without the humidifying effect of the $NO_2$ scrubber 10, changes in the relative humidity in the ambient atmosphere when analyzing pollutant levels of NO and $NO_2$ in air, would necessitate more frequent changes in the oxidizing agent. In addition, where use is made of the method and apparatus of this invention in cold weather, the scrubber 10 essentially serves to supply essentially all of the moisture necessary to activate the oxidizing agent to achieve an acceptable conversion of NO to $NO_2$.

The gas sample containing $NO_2$ in an amount corresponding to the amount of NO in the original gas sample is then drawn from the oxidizer 14 to a second $NO_2$ absorber or scrubber 16 in which the sample is contacted with a reagent solution of the type described above for the development of color. It is generally preferred that scrubber 16 be of the same type as scrubber 10. As will be appreciated by those skilled in the art, the intensity of the color developed in the spent reagent solution issuing from scrubber 16 (relative to the intensity of color of the reagent solution supplied to scrubber 16) is a measure of the $NO_2$ contained in the gas sample and consequently is also a measure of the NO content of the original gas sample introduced to scrubber 10.

In the preferred practice of this invention, the path of the gas sample is a closed path from the gas sample inlet of scrubber 10 to the gas outlet of scrubber 16. In this way, the gas sample can be passed through the system by simply applying a source of vacuum to the gas outlet of scrubber 16 whereby the gas sample is drawn through each of the zones described with stable flow.

The preferred apparatus for carrying out the method of this invention makes use of the scrubber and photocell assembly of the type described in my earlier copending application, Ser. No. 46,308, the disclosure of which is incorporated herein by reference.

Referring now to FIG. 2 of the drawings, there is shown a first $NO_2$ absorber or scrubber 20 in the form of a helical coil having a substantially vertical axis such that each portion of the helix is inclined at a slight angle to facilitate gravitational flow of liquid through the coiled tubing with substantially no turbulence. The upper portion of the coil is provided with a substantially vertical portion 22 which is bent at a right angle at its uppermost portion 24 and which is open at the end to receive a gas sample supplied thereto. If desired, the sample may be drawn into scrubber 20 through a filter (not shown in the drawing) to remove any particulate matter from the gas sample prior to analysis.

Intermediate between right angle portion 24 and coil 20 there is provided a nipple 26 communicating with the interior of tubing 22 for the introduction of aqueous reagent solution for contact with the gas sample in the coils of helix 20.

The lower portion of the helical coil 20 is provided with a substantially vertical downwardly extending portion 28 which terminates in a gas-liquid passage chamber 30 in the form of a bulb having an expanded diameter. Bulb 30 is provided in one side wall thereof with nipple means 32 for passage of unabsorbed gases from coil 20 and bulb 30 to subsequent portions of the apparatus.

The bulb 30 terminates in a nipple 34 which is connected to a suitable pump 36, which is preferably a peristaltic pump capable of pumping two separate liquids simultaneously, by means of a tube 38 whereby the contents of bulb 30 flow through nipple 34 and through tube 38 to pump 36 from which the liquid is pumped through line 40 to a reference photocell 42.

The liquid pumped through line 40 is passed to a gas-liquid separator 44 which can be in the form of a bulb 46 into which extends a tube 48 whereby the liquid flows down the wall of bulb 46 into the transparent tube means 50 for passage through measuring photocell 42 of the photocell assembly and subsequently through tube 52 for passage to a drain.

The apparatus of the present invention also includes tube means 54 for supplying aqueous reagent solution through reference photocell 56 to pump 36 by way of tube means 58. From the pump 36, the reagent solution is passed by way of tube means 60 to nipple 26 for introduction of the aqueous reagent solution into scrubber 20. As is described in the aforesaid copending application, the tube extended through reference photocell 56 is similarly transparent to enable the color intensity of the reagent solution, prior to contact with the gas sample in the scrubber 20, to be ascertained.

The photocell assembly preferably used in the practice of this invention is the same type as described in my aforementioned copending application. As previously described, the photocell assembly includes a lamp or light source 62 which is enclosed by a housing 64 having a pair of openings 66 and 68 spaced about the periphery of the lamp housing. In the preferred embodiment, openings 66 and 68 are separated from each other by a distance slightly less than 180° about the periphery of the cylinder housing 64.

Positioned on either side of the enclosed light source 62 is a pair of opposing photocell housings 42 and 56 having central openings therethrough adapted to receive transparent tubes 50 and 70, respectively, which extend therethrough and direct the reagent composition through the photocell housings subsequent to reaction with absorbed $NO_2$ and prior to reaction with $NO_2$, respectively.

Each of the photocell housings 42 and 56 is also provided with a second and substantially transverse opening 72 and 74 to permit light from the light source 62 to illuminate photoresistive cells contained in each photocell housing through openings 68 and 72, and openings 66 and 74, respectively. As will be appreciated by those skilled in the art and as described in further detail in my earlier copending application, each of the photocell housings is provided with a photoresistive cell such as a cadmium sulfoxide photoresistive cell, the electrical resistance of which is dependent upon the intensity of light to which each cell is exposed.

Thus, prior to use, the resistance of each cell can be balanced against the other by rotating the lamp housing 64 about its axis prior to the time that the reagent solution is contacted with absorbed $NO_2$ to minimize variations from the effect of temperature and light level. Thus, the portion pumped into measuring photocell 42 once the analysis has commenced has developed color, the intensity of which is calibrated with the color of fresh reagent solution passed through photocell 56 to determine the relative color development in the reagent solution after contact with absorbed $NO_2$ in scrubber 20. The measurement of the color intensity is further described in the aforementioned copending application.

Returning to scrubber assembly 20, unabsorbed gases from scrubber 20 are separated in bulb 30 whereby the liquid component is drained from bulb 30 through nipple 34 and tube 38, and the gas sample containing NO and minor amounts of $NO_2$ is passed to $NO_2$ adsorber 76 which, as is described above, is provided with a charge of an amine compound to effect substantially complete removal of residual amounts of $NO_2$ in the gas sample.

From the NO₂ adsorber 76, the gas sample and NO are passed through tube means 78 to a chromic oxide oxidizer chamber 80. As is described above, the oxidizer chamber is provided with a charge of chromic oxide to effect oxidation of the NO contained in the gas sample of NO₂. Thus, gas emerging from the oxidizer chamber 80 contains air and NO₂ which is passed to a second scrubber 82, which is preferably of the same type as scrubber 20, for contact with a second reagent solution for the development of color. As shown in FIG. 2 of the drawings, the gas sample containing NO₂ is passed into absorber 82 through line 84 in which it is contacted with a reagent solution of the type described introduced to absorber 82 through line 86.

Scrubber 82, like its counterpart, scrubber 20, is provided with a separating bulb 84 at the lower portion thereof in which the gas sample is separated from the liquid component containing absorbed NO₂. In the preferred practice of this invention, bulb 84 is provided with a nipple 86 which is connected to a suitable vacuum source whereby application of a vacuum to nipple 86 serves to draw the air sample containing NO and NO₂ through the apparatus. Specifically, and as illustrated in FIG. 2 of the drawing, as a vacuum is applied to nipple 86, an air sample is drawn into portion 24 of scrubber 20 through bulb 30, NO₂ adsorber 76, oxidizer chamber 80 and through the second NO₂ scrubber 82. In this way, a substantially improved stable gas flow is achieved by the use of a single vacuum applied to the apparatus. The liquid component from bulb 84 by way of tube means 88 to a pump 90, which is preferably a pump of the same type as pump 36 for passage of the reagent solution after contact with absorbed NO₂ by way of line 92 to a second photocell assembly which is similar in all respects to the photocell assembly described above. At the same time, reagent solution is passed through line 94 to a second reference photocell for passage through pump 90 via tube means 86 for introduction to the second absorber 82.

While description has been made of the use of separate pumping means for each absorber system, it will be understood by those skilled in the art that, if desired, use can be made of a single pump which is capable of pumping four liquid streams simultaneously. In fact, if desired, use can be made of but a single reference photocell since the reagent solution employed in each of the NO and NO₂ flow circuits of the apparatus of this invention is preferably the same.

Thus, in the operation of the apparatus of this invention, the pumps or pump are started to commence circulation of the reagent solution through the systems described and each of the photocell assemblies is balanced against the reference photocell. Thereafter, a vacuum source is supplied to nipple 86 to draw in a gas sample through line 24 into scrubber 20 and on through the apparatus as described. The NO₂ in the initial gas sample introduced through tube 24 is absorbed in scrubber 20 by means of a reagent solution for the development of color, the intensity of which is measured by the measuring photocell 42 against the color of the reagent solution determined by photocell 56. As will be appreciated by those skilled in the art, the output of the first photocell or cells 42 and 56 is a measurement of the concentration of the NO₂ in the initial gas sample.

The unabsorbed gases including NO are passed from bulb 30 to the NO₂ adsorber 76 in which substantially all NO₂ remaining is removed. From NO₂ adsorber 76, the gas sample containing NO is passed to oxidizer chamber 80 in which the NO is oxidized to NO₂, and the NO₂ thus formed is absorbed in a reagent solution in scrubber 82 for the development of color in the reagent solution, the intensity of which is measured by the second photocell assembly 96. As will be appreciated by those skilled in the art, the output of the second photocell assembly 96 is a measurement of the concentration of the NO in the original gas sample.

It will be apparent from the foregoing that I have provided a new and improved method and apparatus for the simultaneous analysis of the NO and NO₂ content of a gas sample by colorimetric technique with improved accuracy.

It will be understood that various changes and modifications can be made in the details of construction, procedure, formulation and use without departing from the spirit of the invention, especially as defined in the following claims.

I claim:

1. A method for determining the content of NO₂ and NO in a gas comprising the steps of contacting the gas with a first aqueous reagent solution containing a diazotization agent and a coupling compound whereby the NO₂ in the gas reacts with the reagent solution for the development of color and the gas is humidified, measuring the difference in intensity of color in the first reagent solution before and after contact with NO₂ to determine the content of NO₂ in the gas, removing residual amounts of NO₂ from the gas, contacting the resulting NO-containing gas with a solid oxidizing agent to oxidize NO to NO₂, contacting the gas containing NO₂ with a second reagent solution containing a diazotizing agent and a coupling compound for the development of color and measuring the difference in intensity of color in the second reagent solution before and after contact with NO₂ to determine the content of NO in the gas sample.

2. A method as defined in claim 1 wherein residual amounts of NO₂ are removed by passing the gas in contact with a non-volatile liquid or solid compound containing a free amino group.

3. A method as defined in claim 2 wherein the compound containing a free amino group is selected from the group consisting of aromatic amines, $C_{10}$ and higher alkyl amines, sulfanilic acid and sulfanilamide.

4. A method as defined in claim 2 wherein the compound containing a free amino group is selected from the group consisting of sulfanilic acid and sulfanilamide deposited on an inert carrier.

5. A method as defined in claim 1 wherein the gas is humidified to contain at least 50% relative humidity on contacting the first reagent solution.

6. A method as defined in claim 1 wherein the gas is contacted with the first reagent zone in a scrubbing zone formed of a helical coil having a small inside diameter whereby the liquid flows therethrough in a liquid wave profile.

7. A method as defined in claim 1 wherein the diazotization agent is a primary aromatic amine.

8. A method as defined in claim 1 wherein the coupling agent is selected from the group consisting of aromatic amines and phenolic compounds.

9. Apparatus for determining the content of NO₂ and NO in a gas comprising a first scrubber for contacting the gas with a first reagent solution, said scrubber including a helical coil of tubing having a relatively small diameter mounted on a vertical axis, the upper portion of the coil including inlet means adapted to receive a gas sample and inlet means for introducing the first reagent solution and the lower portion of the coil terminating in a separation bulb, said separation bulb including means at the lower portion thereof to remove spent reagent solution and means to withdraw unabsorbed gases; a first photocell assembly means for measuring the color developed in the first reagent solution in response to contact with NO₂ in the first scrubber as a measure of the NO₂ content of the gas; means to remove residual NO₂ from the gas withdrawn from the means on the separation bulb to withdraw unabsorbed gas; an oxidizer chamber containing an oxidizing agent to oxidize NO in the resulting NO-containing gas to NO₂; a second scrubber for containing the gas from the oxidizer chamber with a second reagent solution, said second scrubber including a helical coil having a relatively small diameter mounted on a vertical axis, the upper portion of the coil including means to introduce the gas containing $NO_2$ from the oxidizer chamber and means to introduce the second reagent solution and the lower portion terminating in a second separation bulb, said separation bulb including means to apply a vacuum thereto to draw a gas through the apparatus and means to withdraw liquid from the bulb; and a second photocell means for measuring the color developed in the second reagent solution on contact with $NO_2$ in the second scrubber as a measure of the NO content of the gas.

10. Apparatus as defined in claim 9 wherein the coil of each scrubber is formed of capillary tubing.

11. Apparatus as defined in claim 9 wherein the tubing of each coil is inclined at an angle sufficient to cause gravitational flow of liquid therethrough with substantially no turbulence.

12. Apparatus as defined in claim 9 wherein each of the photocell assembly means includes a pair of spaced opposing cell housings, each of said housings defining a central opening therethrough adapted to receieve tube means for passage of a liquid therethrough and defining a second opening transverse to said central opening terminating in a recess adapted to receeive a photoresistor on opposing faces of the housings, a photoresistor in each recess, a light source between the cell housings, transparent tube means extending through each of said central opening between the light source and the photoresistor and means associated with the light source to adjust the amount of light illuminating each photoresistor to balance the photoresistor of each photocell assembly.

13. Apparatus as defined in claim 12 wherein the means to adjust the amount of light illuminating each light source includes a substantially cylindrical lamp housing having openings on the peripheral surface thereof to project optical spots through the transparent tube means to illuminate the photoresistors.

14. Apparatus as defined in claim 12 which includes pump means to supply unreacted reagent solution and spent solution to one cell housing of each photocell assembly means for passage through the transparent tube means.

References Cited

Thomas et al.: "Automatic Apparatus for Determination of Nitric Oxide and Nitrogen Dioxide in the Atmosphere," Analytical Chemistry, vol. 28, No. 12, December 1956, pp. 1810–1816.

MORRIS O. WOLK, Primary Examiner

R. E. SERWIN, Assistant Examiner

U.S. Cl. X.R.

23—254 R, 255 R; 250—218